(12) United States Patent
Bostick et al.

(10) Patent No.: US 11,880,390 B2
(45) Date of Patent: Jan. 23, 2024

(54) COGNITIVE IMPROMPTU INTERACTION ASSISTANT

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 15/596,346

(22) Filed: May 16, 2017

(65) Prior Publication Data
US 2018/0336478 A1 Nov. 22, 2018

(51) Int. Cl.
| | |
|---|---|
| *G06Q 10/1093* | (2023.01) |
| *G06F 16/9537* | (2019.01) |
| *G06N 3/006* | (2023.01) |
| *G06F 16/9536* | (2019.01) |
| *H04L 67/52* | (2022.01) |
| *H04L 67/55* | (2022.01) |
| *G06F 16/28* | (2019.01) |

(52) U.S. Cl.
CPC ........ *G06F 16/285* (2019.01); *G06F 16/9536* (2019.01); *G06F 16/9537* (2019.01); *G06N 3/006* (2013.01); *G06Q 10/1095* (2013.01); *H04L 67/52* (2022.05); *H04L 67/55* (2022.05)

(58) Field of Classification Search
CPC .............. G06F 16/285; G06F 16/9537; G06F 16/9536; G06N 3/006; G06Q 10/1095; H04L 67/18; H04L 67/26
See application file for complete search history.

(56) References Cited

U.S. PATENT DOCUMENTS

| | | | |
|---|---|---|---|
| 7,292,151 B2 | 11/2007 | Ferguson et al. | |
| 8,566,403 B2 | 10/2013 | Pascal et al. | |
| 8,838,581 B2 | 9/2014 | Tseng | |
| 9,026,476 B2 | 5/2015 | Bist et al. | |
| 2003/0137435 A1 | 7/2003 | Haddad et al. | |
| 2008/0225870 A1* | 9/2008 | Sundstrom ............. | G06Q 10/10 370/401 |

(Continued)

OTHER PUBLICATIONS

Burbey, Ingrid. Predicting future locations and arrival times of individuals. Diss. Virginia Tech, 2011. (Year: 2011).*

(Continued)

*Primary Examiner* — Li B. Zhen
*Assistant Examiner* — Henry Nguyen
(74) *Attorney, Agent, or Firm* — Robert Richard Aragona; George S. Blasiak; Heslin Rothenberg Farley & Mesiti P.C.

(57) ABSTRACT

Methods, computer program products, and systems are presented. The methods include, for instance: collecting location data of users and identifying candidates for an impromptu interaction amongst the users based on converging locations of the candidates. A topic of the impromptu interaction is determined by common work interests amongst the candidates. Notification of the impromptu interaction is sent to the candidates to inform the topic and the other candidate, also with resources relevant to the topic.

20 Claims, 8 Drawing Sheets

(56) References Cited

U.S. PATENT DOCUMENTS

| | | | |
|---|---|---|---|
| 2011/0252108 A1* | 10/2011 | Morris | H04L 51/32 |
| | | | 709/206 |
| 2013/0046770 A1* | 2/2013 | Tseng | G06Q 30/00 |
| | | | 707/748 |
| 2013/0159408 A1 | 6/2013 | Winn et al. | |
| 2014/0222433 A1* | 8/2014 | Govrin | G06N 5/04 |
| | | | 704/260 |
| 2016/0063547 A1* | 3/2016 | Ghosh | G06Q 30/0255 |
| | | | 705/14.53 |
| 2016/0300178 A1* | 10/2016 | Perry | G06Q 10/063116 |
| 2016/0321551 A1* | 11/2016 | Priness | G06N 5/047 |
| 2016/0330144 A1* | 11/2016 | Dymetman | G06N 7/01 |
| 2017/0220577 A1* | 8/2017 | Pal | G06F 16/24578 |
| 2017/0236081 A1* | 8/2017 | Grady Smith | G06Q 10/067 |
| | | | 705/7.36 |
| 2018/0196796 A1* | 7/2018 | Wu | G06F 40/289 |
| 2018/0211260 A1* | 7/2018 | Zhang | G06N 20/00 |
| 2020/0234384 A1* | 7/2020 | Wu | G06Q 50/01 |
| 2020/0401966 A1* | 12/2020 | Miinch | G06Q 10/067 |

OTHER PUBLICATIONS

Anonymous, "Method and System for Cognitive Association Prediction and Notification Based on Predicted Discussion Topic", IP.com No. ICOM000247238D, Aug. 17, 2016, 3 pgs (Year: 2016).*

Anonymous, "Method and System for Cognitive Association Prediction and Notification Based on Predicted Discussion Topic", IP.com No. IPCOM000247238D, Aug. 17, 2016, 3 pgs.

Anonymous, "System to Provide Users with Impromptu Conversation Summaries and Make Conversational Recommendations, with an Emphasis on Personal Customization, Based on Previous Conversations," IP.com No. IPCOM000246660D, Jun. 24, 2016, 6 pgs.

Mell, Peter, et al., "The NIST Definition of Cloud Computing", NIST Special Publication 800-145, Sep. 2011, Gaithersburg, MD, 7 pgs.

* cited by examiner

US 11,880,390 B2

COGNITIVE IMPROMPTU INTERACTION ASSISTANT

TECHNICAL FIELD

The present disclosure relates to cognitive analysis technology, and more particularly to methods, computer program products, and systems for predicting, notifying, and supporting impromptu interactions in an organizational environment.

BACKGROUND

In conventional corporate communication environment, work space is limited to certain places such as conference room, office desks, etc. Although in-person communication may benefit progresses of shared tasks, administrative work involved in scheduling and getting together may not be desirable. Even employees who need discussion on a certain tasks walk by each other, the employees may not notice each other, recall the topic, and/or do not have necessary work files with them to further the discussion.

SUMMARY

The shortcomings of the prior art are overcome, and additional advantages are provided, through the provision, in one aspect, of a method. The method for accommodating an impromptu interaction includes, for example: collecting, by one or more processor, location data of two or more users by use of respective user devices; identifying two or more candidates for the impromptu interaction amongst the users responsive to determining that respective locations of the candidates are converging; predicting a topic of the impromptu interaction based on a common work interest amongst the candidates; and sending a notification of the impromptu interaction to one of the candidates responsive to generating the notification including the topic, identification of another of the candidates, and links to resources relevant to the topic.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
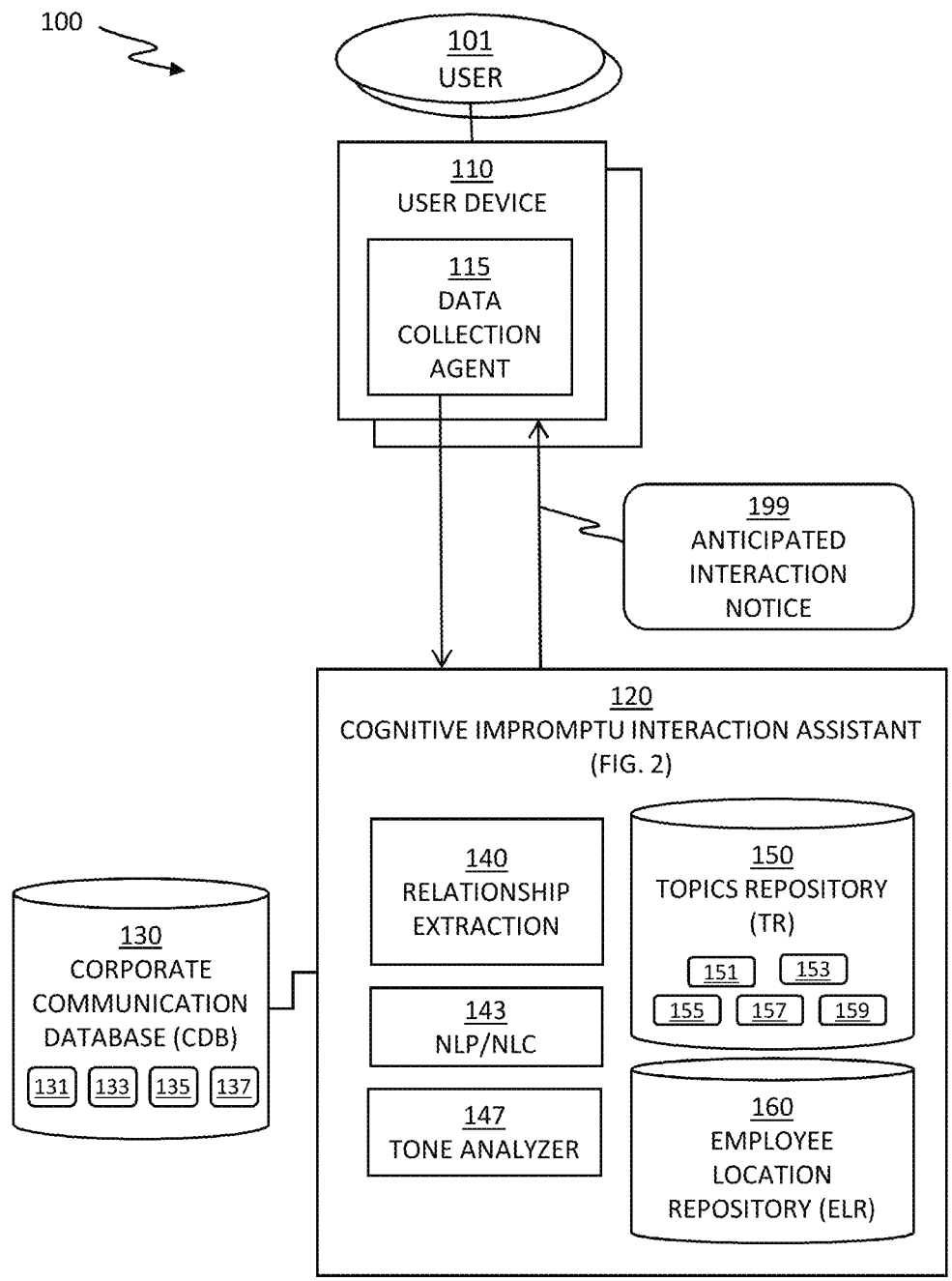
FIG. 1 depicts a system for predictive assistance for impromptu interactions, in accordance with one or more embodiments set forth herein.

FIG. 1 depicts a system 100 for predictive assistance for impromptu interactions, in accordance with one or more embodiments set forth herein.

The system 100 providing impromptu interaction assistance services includes one or more user, one or more user device respectively corresponding to each user of the one or more user, a cognitive impromptu interaction assistant 120, and a corporate communication database (CDB) 130. A user 101 from the one or more user carries on the person of the user 101 a user device 110 of the one or more user device. The user device 110 runs a data collection agent 115 that provides input data for the cognitive impromptu interaction assistant 120. The user 101 corresponding to the user device 110 may generate the input data, including but not limited to, real time audio data, real time geolocation data, etc., by moving around and/or talking within a corporate premises. The user 101 may be an employee and/or a guest who agreed to terms and conditions of the impromptu interaction assistance services. The user device 110 may be, but are not limited to, a smart phone, a smart watch, a tablet, a laptop, a smart mobile device, an augmented reality glass, or a designated mobile device equipped to transfer the input data to the cognitive impromptu interaction assistant 120 and to receive an anticipated interaction notice 199 from the cognitive impromptu interaction assistant 120.

The corporate communication database (CDB) 130 collectively indicates numerous interconnected data sources including data utilities proprietary to a corporation/organization subscribes to the impromptu interaction assistance services. In this specification, terms "corporation", "corporate" are used to indicate any entity having multiple members, referred to as "employees", and characteristics thereof, and may be used interchangeably with institution, organization, etc. The CDB 130 includes communication records and work product files that may be utilized for predicting impromptu interactions. The CDB 130 may include, but are not limited to, emails 131, corporate community postings 133, instant messages 135, and work products 137, etc., and respectively corresponding communication utilities, server systems, and archived data. The emails 131 are electronic mail messages exchanged by the employees of the corporation via respective corporate email accounts and corporate email servers. The corporate community postings 133 includes activities, shared files, and communication messages exchanged amongst and/or informed to the employees via a corporate community network. The instant messages 135 are messages exchanged via a corporate instant messaging system. The work products 137 are shared documents and files within the corporation amongst the employees via a corporate file sharing system. The cognitive impromptu interaction assistant 120 accesses up-to-date content of the CDB 130 according to data update configuration of respective elements of the CDB 130, as the emails 131, the corporate community postings 133, the instant messages 135, and the work products 137 evolve, which is not discussed in this specification. Respective content of the CDB 130 may correspond to specific teams, organizational departments, projects, respective assignments of each employee, etc., such that the correlation may be analyzed in order to discover common work interests amongst certain group of employees, by use of the cognitive impromptu interaction assistant 120.

The cognitive impromptu interaction assistant 120 includes, or otherwise has access to, a relationship extraction process 140, a topics repository (TR) 150, an employee location repository (ELR) 160, and various utility tools including a natural language processing and natural language classifying component (NLP/NLC) 143 and a tone analyzer 147. The NLP/NLC 143 processes unstructured text data as written in, or spoken and transcribed/translated into, a supported target natural language, and classifies into certain key points, either preconfigured or extracted from the analyzed content. In certain embodiments of the present invention, the cognitive impromptu interaction assistant 120 may be implemented with the NLP/NLC 143 and the tone analyzer 147 as external service functionalities.

The cognitive impromptu interaction assistant 120 generates the topics repository (TR) 150 based on data of the CDB 130 by use of the relationship extraction process 140, the NLP/NLC 143, and the tone analyzer 147. The NLP/NLC 143 analyzes the content of the CDB 130 and classifies into various names and keywords that may be further classified into topics and employee names. The relationship extraction process 140 catalogues topics and relates work relationships amongst users, and the content of the CDB 130 according to the topics. The TR 150 stores topics 151, as catalogued by the relationship extraction process 140. The TR 150 also stores owners 153 and associated people 155 of respective topics, in order to represent work relationships amongst employee with respect to the topics. An owner of a topic may be a team leader, or otherwise listed as a person in charge of a task represented by the topic, and the associated people may be all other collaborators have respective names appearing in part of the content of the CDB 130 on the task represented by the topic, as a team, a taskforce, a department, etc. In this specification, both owner and associated people are deemed to be involved with the topic, and any employee who authored or has been mentioned in any communication and/or work product would be deemed involved. The TR 150 also stores priorities 157 of the respective topics, indicating significances and/or urgencies of the respective topics 151, as compiled by the tone analyzer 147 from the content of the CDB 130. The TR 150 also stores related resources 159 indicating any of the content from the CDB 130 that is relevant to the respective topics. The resources 159 related the topic that are readily identifiable from the content of the CDB 130 by use of the keyword search and/or directory relevant to the respective topics. The resources 159 relevant to the respective topics 151 may be accessed from the CDB 130 by reference without physically being replicated into the TR 150. The resources 159 may include, but are not limited to, event logs, spreadsheets, documents and/or presentation files, threads and/or snippets of emails, threads and/or snippets of instant messages, etc., available directly or indirectly via compiling from the content of the CDB 130 which may be helpful for any impromptu interaction discussing the topic 151.

The employee location repository (ELR) 160 of the cognitive impromptu interaction assistant 120 maintains respective real time location of each employee based on various methods as the user 101 moves around in the corporate premises. The cognitive impromptu interaction assistant 120 maintains the content of the ELR 160 synchronized with respective actual real time locations of each employee. In certain embodiments of the present invention, the cognitive impromptu interaction assistant 120 may be configured to track a selected group of employees, such as owners of the topics in the TR 150, owners of the topics having priorities higher than a certain threshold, etc.

The cognitive impromptu interaction assistant 120 generates the anticipated interaction notice 199 by predicting an impending impromptu interaction for the user 101 by use of the input data from the user device 110, and various content of the CDB 130 and the TR 150 which are relevant to the various aspects of the predicted impromptu interaction. The cognitive impromptu interaction assistant 120 subsequently delivers the anticipated interaction notice 199 to the user device 110 in order to inform the user 101 of the impromptu interaction/meeting as predicted.

The cognitive impromptu interaction assistant 120 provides cognitive impromptu interaction assistance services in order to improve productivity and work efficiency in the corporate environment in numerous ways. First, in conventional corporate setting, people walk by other colleagues without realizing they have a common work interest that may be benefited by addressing a certain issues. By use of cognitive impromptu interaction assistance services, an opportunity to make progress on the common work interest may not be lost only because the passing-by colleagues did not notice the need for the common work interest. Not only notifying the opportunity, the cognitive impromptu interaction assistance services may further assist a discussion by making resources related to the common work interest available at the spot of the impromptu interaction, when colleagues notice the common interest and attempt the discussion. Without scheduling a formal conference, the colleagues may be able to make necessary progress for the common work interest, in particularly simpler matters that scheduling a conference and/or getting together is harder to achieve than actually work out an issue, in matters nuanced and would be benefited by face-to-face discussion rather than emails and instant messages, etc.

Figure 2:
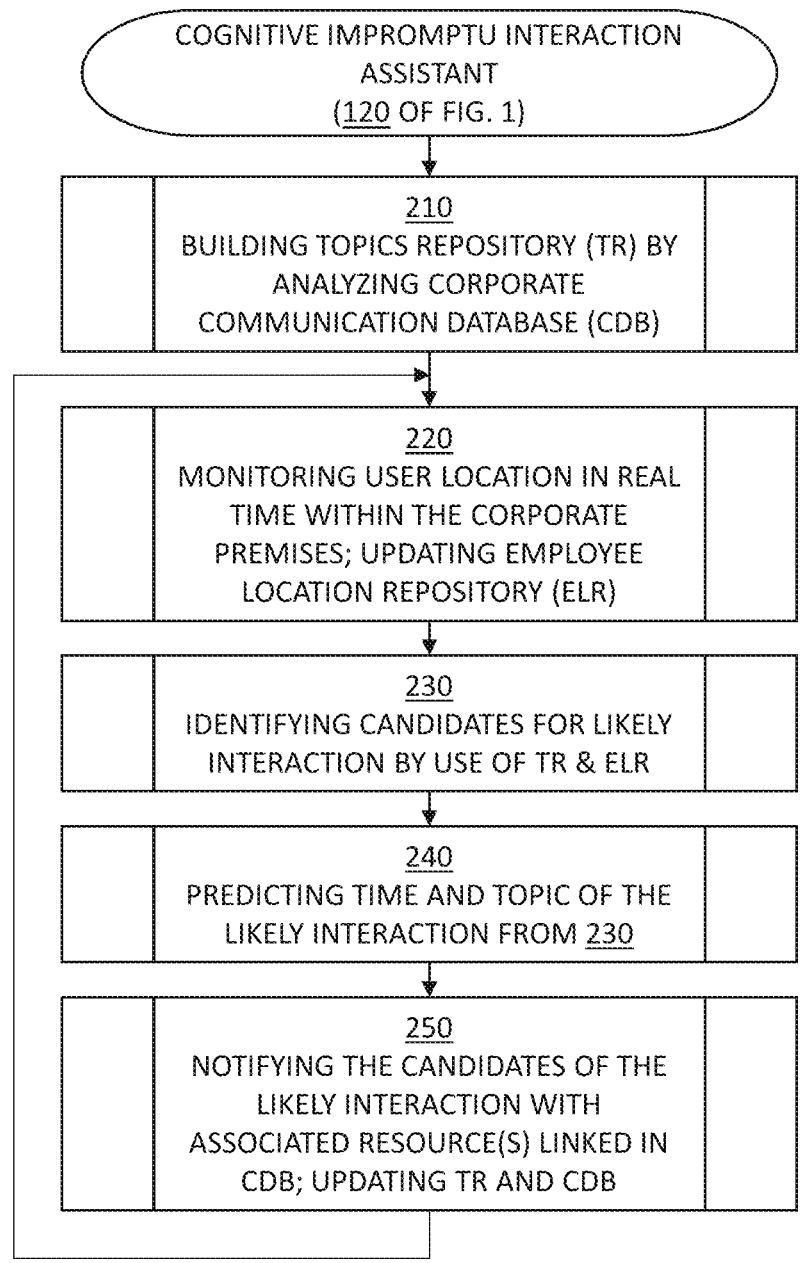
FIG. 2 depicts a flowchart performed by the cognitive impromptu interaction assistant of the system, in accordance with one or more embodiments set forth herein.

FIG. 2 depicts a flowchart performed by the cognitive impromptu interaction assistant 120 of FIG. 1, in accordance with one or more embodiments set forth herein.

In block 210, the cognitive impromptu interaction assistant 120 builds the topics repository (TR) 150 by analyzing the corporate communication database (CDB) 130. The cognitive impromptu interaction assistant 120 determines which topics are presently being discussed, who owns respective topics, who else is contributing to or associated with each topic, respective priorities of each topic, and resources associated with each topic, based on analyzing the CDB 130 by use of the NLP/NLC 143 and the tone analyzer 147. Accordingly, the cognitive impromptu interaction assistant 120 stores aforementioned attributes determined from the analysis of the CDB 130 in the TR 150 as topics 151, the owners 153, the associated people 155, the priorities 157, and the related resources 159, respectively. Then the cognitive impromptu interaction assistant 120 proceeds with block 220.

In certain embodiments of the present invention, the cognitive impromptu interaction assistant 120 summarizes lengthy emails and an extended thread of instant messages as exchanged amongst employees into key points of discussion, which may be stored as the topics 151 in the TR 150, by use of natural language processing functionality of the NLP/NLC 143. The cognitive impromptu interaction assistant 120 classifies unstructured text conversations including the emails 131 and the instant messages 133 according to the topics 151 by utilizing natural language classification functionality of the NLP/NLC 143, and associates the emails and instant messages as with the respective topics. The cognitive impromptu interaction assistant 120 may link any files and documents from the CDB 130 exchanged in the analyzed conversations to the respective topics as the respective resources 159. The cognitive impromptu interaction assistant 120 may determine the owner 153 of each topic and the associated people 155 for each topic by use of the relationship extraction process 140. The relationship extraction process 140 may further relate particular locations and other organizations relevant to each topic. The cognitive impromptu interaction assistant 120 may determine a tone of communication for each topic by use of the tone analyzer 147, in order to determine respective priority of each topic.

In block 220, the cognitive impromptu interaction assistant 120 monitors user location in real time within the corporate premises and updates content of the employee location repository (ELR) 160 such that the location data for respective employees stored in the ELR 160 would be reasonably close to actual locations of the monitored employees for reliable impromptu interaction assistance services. In maintaining the real time locations of the respective employees, the cognitive impromptu interaction assistant 120 may utilize by use of: the real time geolocation data as input from the user devices respectively corresponding to each employee for an exact global positioning system (GPS) coordinates; Wi-Fi hotspot identification to which each employee is connected in determining approximate locations of the respective employees; security entrance and exit system data associated with specific areas for which each employee is required to use an individual security device for identification such as a badge, a tag, in determining whether or not an employee is in the specifically controlled area; calendar data with an identified event location in determining where an employee would be at certain time even for what purpose; status data with the corporate instant messaging system such as "Away" and corresponding description of status such as "coffee break", "lunch", etc., in determining respective locations at which the employee may be located, such as a coffee shop, cafeteria, etc.; and combinations thereof. The cognitive impromptu interaction assistant 120 updates the content of the ELR 160 based on an update configuration for tracking real time data, including, but not limited to, periodic update, update upon new input, etc. Then the cognitive impromptu interaction assistant 120 proceeds with block 230.

In block 230, the cognitive impromptu interaction assistant 120 identifies candidates for a likely interaction based on data from the TR 150 and the ELR 160. The cognitive impromptu interaction assistant 120 determines if a certain group of people would be at a same location, based on, for example, respective meeting schedules as represented by a calendar event stored in the CDB 130, a short term prediction of respective location of two or more employees based on the respective location data from the ELR 160 and the directions of the movements. The cognitive impromptu interaction assistant 120 further examines if the people share any common interest as represented by a shared topic in the TR 150. For example, one of two candidates may be an owner of a topic, and the other candidate may be listed in the associated people corresponding to the topic. The cognitive impromptu interaction assistant 120 identifies two candidates who are about to run into each other, as the two candidates have a shared topic on which the candidates may interact by asking questions on issues relevant to the topics, discussing events relevant to the topics, etc. Then the cognitive impromptu interaction assistant 120 proceeds with block 240.

In block 240, the cognitive impromptu interaction assistant 120 predicts the time and/or location of the likely interaction between the candidates as identified in block 230 and the topic on which the candidates might discuss during the likely interaction. The cognitive impromptu interaction assistant 120 examines probability of various paths the candidates identified in block 230 would take, in order to predict the time of the likely interaction. For the likely interaction that is predicted to happen, the cognitive impromptu interaction assistant 120 examines if there is any shared interest between the identified candidates in order to predict the topic of the interaction. The cognitive impromptu interaction assistant 120 may further associate resources relevant to the predicted topics, by use of analyzing the CDB 130 and/or retrieving resources corresponding to the predicted topics as stored in the TR 150. Then the cognitive impromptu interaction assistant 120 proceeds with block 250.

In certain embodiments of the present invention, in order to determine the time/location of the likely interaction, the cognitive impromptu interaction assistant 120 may utilize one or more scheduled event for the candidates based on calendar data, the real time location data of the ELR 160 of the candidates, movement patterns of the candidates as determined by cumulated location data from the ELR 160, and combinations thereof. For example, if the cognitive impromptu interaction assistant 120 observes that a first candidate may have a meeting scheduled at a conference room in ten minutes according to the calendar data, and that a second candidate is present in the same conference room at the moment according to the location data of the ELR 160, then the cognitive impromptu interaction assistant 120 may predict the likely interaction between the first candidate and the second candidate would happen within ten minutes when the first candidate arrives at the conference room for the scheduled meeting, where the second candidate is presently located. For another example, if the cognitive impromptu interaction assistant 120 observes that the identified candidates are independently moving in respective paces and directions converging to a spot according to the real time location data in the ELR 160, then the cognitive impromptu interaction assistant 120 may predict the likely interaction between the candidates at the time of convergence on the spot. For still another example, if the cognitive impromptu interaction assistant 120 observes a movement pattern in which one of the identified candidates ordinarily goes to the cafeteria around noon based on the ELR 160, and that another candidate is passing by the cafeteria around noon according to the real time location data in the ELR 160, then the cognitive impromptu interaction assistant 120 may predict that the likely interaction may happen around noon in front of the cafeteria. Examples of predicted group interaction are presented in FIG. 3 and corresponding description.

In certain embodiments of the present invention, in order to determine the topic of the likely interaction, the cognitive impromptu interaction assistant 120 may analyze the content of the CDB 130 for tasks common to the candidates such as shared projects, events, etc., as well as priorities of respective tasks, how recent and focused the workhours/effort on the respective tasks. The cognitive impromptu interaction assistant 120 predicts the topics of the likely interaction based on the commonality, the priority, and other factors of respective tasks as analyzed. The cognitive impromptu interaction assistant 120 may further assign a confidence score for each predicted topic. The confidence score for each topic may be determined to correspond with for example, a number of people involved with the topic, a priority of the topic, latest focus of workhours by the people involved with the topic, and combinations thereof, to indicate a likelihood of the topic to be discussed in the impromptu interaction amongst the candidates. Examples of predicted topics, respective confidence scores, and resources relevant to the respective topics are presented in FIG. 4 and corresponding description.

In block 250, the cognitive impromptu interaction assistant 120 notifies the candidates identified in block 230 of the likely interaction as predicted, by sending respective messages to user devices corresponding to the candidates identified from block 230. Where new data have been created or otherwise necessary based on update configuration of the TR 150 and the CDB 130, the cognitive impromptu interaction assistant 120 updates content of the TR 150 and the CDB 130. Then the cognitive impromptu interaction assistant 120 loops back to block 220 for continued monitoring in order to provide assistance for other impromptu interactions.

In certain embodiments of the present invention, the cognitive impromptu interaction assistant 120 may identify, in the notification, the other candidate or a group of candidates, a predicted topic, a confidence score for the prediction on the topic, and resources related with the topic that may be helpful for a discussion on the topic. The candidates of the impromptu interaction may be identified by respective names, departments, etc. An example of a notification of a likely interaction is presented in FIG. 5 and corresponding description. In certain embodiments of the present invention, another notification to follow up the predicted interaction, such as requesting a feedback as to the utility of the impromptu interaction assistance that had been provided.

Figure 3:
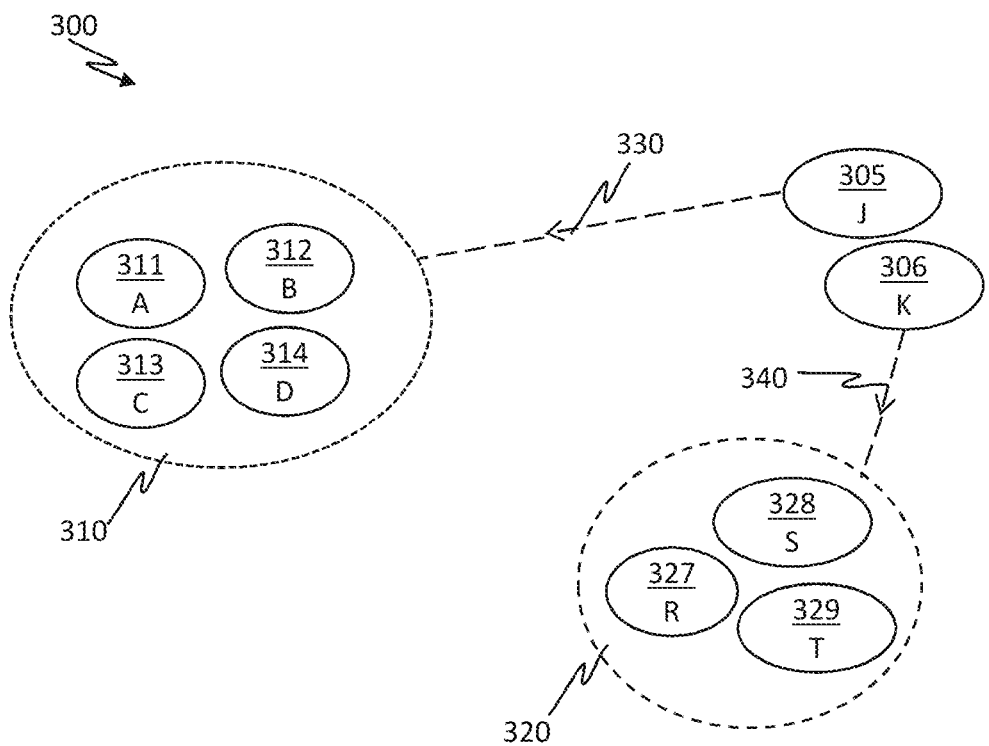
FIG. 3 depicts an exemplary layout wherein the cognitive impromptu interaction assistant provides assistance services for likely group interactions, in accordance with one or more embodiments set forth herein.

FIG. 3 depicts an exemplary layout 300 wherein the cognitive impromptu interaction assistant 120 provides assistance services for likely group interactions, in accordance with one or more embodiments set forth herein.

Initially, in block 210 of FIG. 2, the cognitive impromptu interaction assistant 120 has the topics repository 150 ready for all users in the exemplary layout 300, which include nine (9) employees in three (3) groups. The topics repository 150 has topics 151, respective owners 153, associated people 155 listing employees involved in the respective topics other than the owner, respective priorities 157, and respective resources 159 related to each topic.

The cognitive impromptu interaction assistant 120 monitors locations of the employees in the three groups in block 220 of FIG. 2. A first group 310 includes Employee A 311, Employee B 312, Employee C 313, and Employee D 314, who are stationary and may or may not be engaged in an impromptu interaction at the moment. Similarly, a second group 320 includes Employee R 327, Employee S 328, and Employee T 329, who are stationary and may or may not be engaged in an impromptu interaction at the moment. A third group includes two individual employees Employee J 305 and Employee K 306, respectively beginning to move in distinctive directions.

In block 230, the cognitive impromptu interaction assistant 120 detects that Employee J 305 is moving in the direction of the first group 310, as shown in arrow 330, and identifies Employee J 305, and the first group 310 as candidates for a first impromptu meeting by use of respective location data in the ELR 160. The cognitive impromptu interaction assistant 120 determines if the members of the first group 310 has any common interests with the Employee J 305 by use of the TR 150. Similarly, the cognitive impromptu interaction assistant 120 detects that Employee K 306 is moving in the direction of the second group 320, as shown in arrow 340, and identifies Employee K 306, and the second group 320 as candidates for a second impromptu meeting. The cognitive impromptu interaction assistant 120 checks the TR 150 to determine if the members of the second group 310 has any common interest with the Employee K 306.

In block 240, the cognitive impromptu interaction assistant 120 looks up the TR 150 and discovers that Employee A 311, Employee C 313, and Employee D 314 from the first group 310 and Employee J 305 are involved in a first topic, as an owner or as associated people. The cognitive impromptu interaction assistant 120 tracks location data of Employee J 305 from the ELR 160, indicating that Employee J 305 is moving in a pace and a direction that will arrive at a location within a preconfigured proximity from a spot that is presently occupied by the first group 310 in about three (3) minutes. The preconfigured proximity may be determined according to the building structures including doors and walls, shapes of the space, the line of sight, etc. Accordingly, the cognitive impromptu interaction assistant 120 predicts that the Employee A 311, Employee C 313, Employee D 314, and Employee J 305 may have an impromptu discussion on the first topic in three minutes. The cognitive impromptu interaction assistant 120 may quantify the respective likelihoods of the topics being discussed in the impromptu interaction, as confidence scores respective to each topic. Wherein more than one topic is discovered to be of common interest amongst the candidates, the cognitive impromptu interaction assistant 120 may compare respective confidence scores of the topics in order to determine the most likely topic for the impromptu discussion. The cognitive impromptu interaction assistant 120 similarly processes location data of the ELR 160 and various data from the TR 150 for Employee K 306 and the second group 320. Wherein a pre-existing gathering such as the first group 310 and the second group 320, and/or more than three candidates are involved as shown in the present example, the cognitive impromptu interaction assistant 120 may select a common interest more efficiently from the shared interest of the groups, and with more confidence than in cases for one-on-one interactions wherein a number of common interests may be discovered.

In block 250, the cognitive impromptu interaction assistant 120 notifies the candidates, Employee A 311, Employee C 313, Employee D 314, and Employee J 305, of the impromptu discussion with the topic, predicted time, and any resource relevant to the first topic via respective mobile devices on the person of all candidates.

Figure 4:
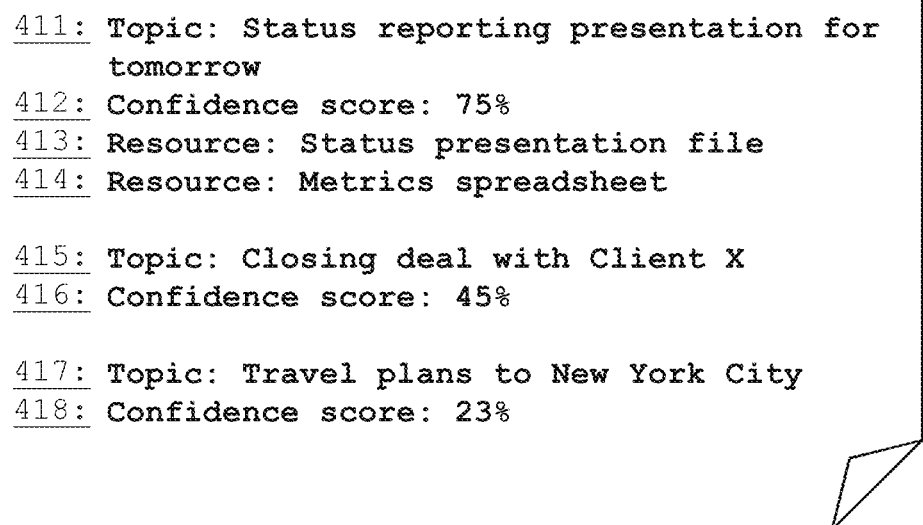
FIGS. 4 and 5 depict exemplary results generated the cognitive impromptu interaction assistant in a group interaction scenario shown in FIG. 3, in accordance with one or more embodiments set forth herein.
Figure 5:
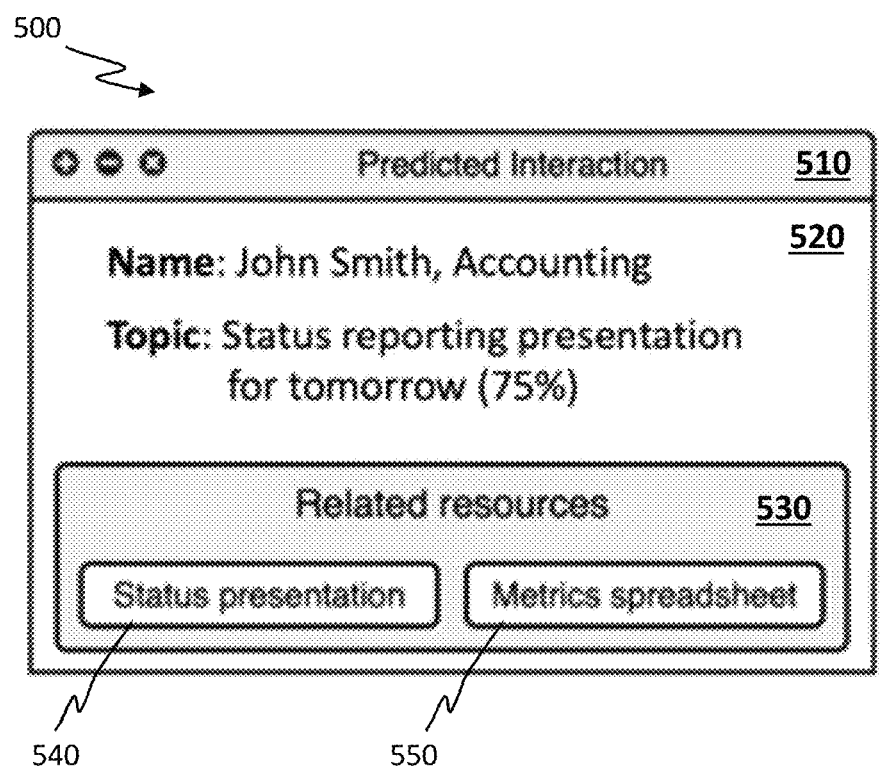

FIGS. 4 and 5 depict exemplary results generated the cognitive impromptu interaction assistant 120 in a group interaction scenario shown in FIG. 3, in accordance with one or more embodiments set forth herein.

Listing 410 of FIG. 4 may be a result from block 240 in analyzing likely topics for the first group 310 and Employee J 305 of FIG. 3. The cognitive impromptu interaction assistant 120 may discover: that a first topic in line 411 is shared amongst Employee A 311, Employee C 313, Employee D 314, and Employee J 305, as an owner or as associate people from the TR 150; that a second topic in line 415 is shared amongst Employee A 311, Employee B 312, and Employee J 305; and that a third topic in line 417 is shared amongst Employee B 311 and Employee J 305. The cognitive impromptu interaction assistant 120 determines respective confidence scores corresponding to each topic 411, 415, and 417, based on numerous factors, including a number of people sharing the topic, the priority of the topic, etc. The confidence scores for the first topic, the second topic, and the third topic are presented in lines 412, 416, and 418, respectively. Lines 411 and 412 represent that the cognitive impromptu interaction assistant 120 determines the confidence score for the first topic as "75%" according to, for example, that there are four candidates involved with the first topic, among other things. Lines 415 and 416 represent that the cognitive impromptu interaction assistant 120 determines the confidence score for the second topic as "45%", similarly with the first topic, because there are three candidates involved with the second topic, among other things. Lines 417 and 418 similarly represent that the cognitive impromptu interaction assistant 120 determines the confidence score for the third topic as "23%", among other reasons, because there are two candidates involved with the third topic. Because the first topic in line 411 has the highest confidence score amongst the three topics in listing 410, the cognitive impromptu interaction assistant 120 selects the first topic in line 411 in block 240. In block 250, the cognitive impromptu interaction assistant 120 associates two resources relevant to the selected first topic as stored in the TR 150, as resources of the first topic in creating a notification of the predicted impromptu interaction and sends to the candidates of the first topic, Employee A 311, Employee C 313, Employee D 314, and Employee J 305.

A notification 500 of FIG. 5 depicts an exemplary notification as appearing on the user device 110, or otherwise delivered to the candidates, in response to the cognitive impromptu interaction assistant 120 performing block 250 of FIG. 2 based on the result of listing 410 for the first topic 411. The notification 500 may be presented to any one of Employee A 311, Employee C 313, Employee D 314 in the first group 310 of FIG. 3, as Employee J 305, described as "John Smith, Accounting", approaches the first group 310. A title "Predicted Interaction" 510 indicates that the notification 500 is for the impromptu interaction assistance service. A body 520 displays name and department of a candidate "John Smith, Accounting" whom the user who receives the notification 500 is about to run into. The body 520 also displays a predicted topic "Status reporting presentation for tomorrow" on which the user is likely to discuss with the candidate described above, as well as a confidence score "(75%)" for the topic indicating how likely the topic would be discussed. The body 520 also has a "Related resources" frame 530 to display resources relevant to the topic "Status reporting presentation for tomorrow". The resources frame 530 includes two buttons "Status presentation" 540, and "Metrics spreadsheet" 550, which may be linked to open respective files as described on the buttons 540, 550, upon being pushed.

Certain embodiments of the present invention may offer various technical computing advantages, including automated impromptu interaction notification based on predictions of topics representing common interests amongst multiple employees. The topics are determined by use of cognitive analysis, natural language processing and classification on content of corporate database including work products, emails, instant messages, and corporate community postings. Further attributes relevant to the topics, such as owners, associated people, priorities, and resources are also determined. Respective locations of the employees in the corporate premise are tracked and monitored, and movements of the employees are analyzed. By use of multithreading and/or multiprocessing, any number of employees may be simultaneously monitored and tracked and the respective locations are recorded in the employee location repository. Converging employees, in group-on-one or in one-on-one basis, are checked out for the likelihood of an impromptu interaction by shared topics in which the employees are interested. If shared interest is identified, the topic is predicted to be discussed in the impromptu interaction and the topic is associated with a confidence score indicating the likelihood of discussion on the predicted topic. Also by use of multithreading and/or multiprocessing, cognitive impromptu interaction assistance services may be rendered for any number of impromptu interactions by concurrently analyzing candidates and topics. Certain embodiments of the present invention may be implemented by use of a cloud platform/data center, and the cognitive impromptu interaction assistance service may be provided as a subscribed service for organizational clients. Certain embodiments of the present invention improves the productivity of the corporate by providing opportunities of in-person communication without planning ahead and by supporting such impromptu interactions with related resources on the spot.

Figure 6:
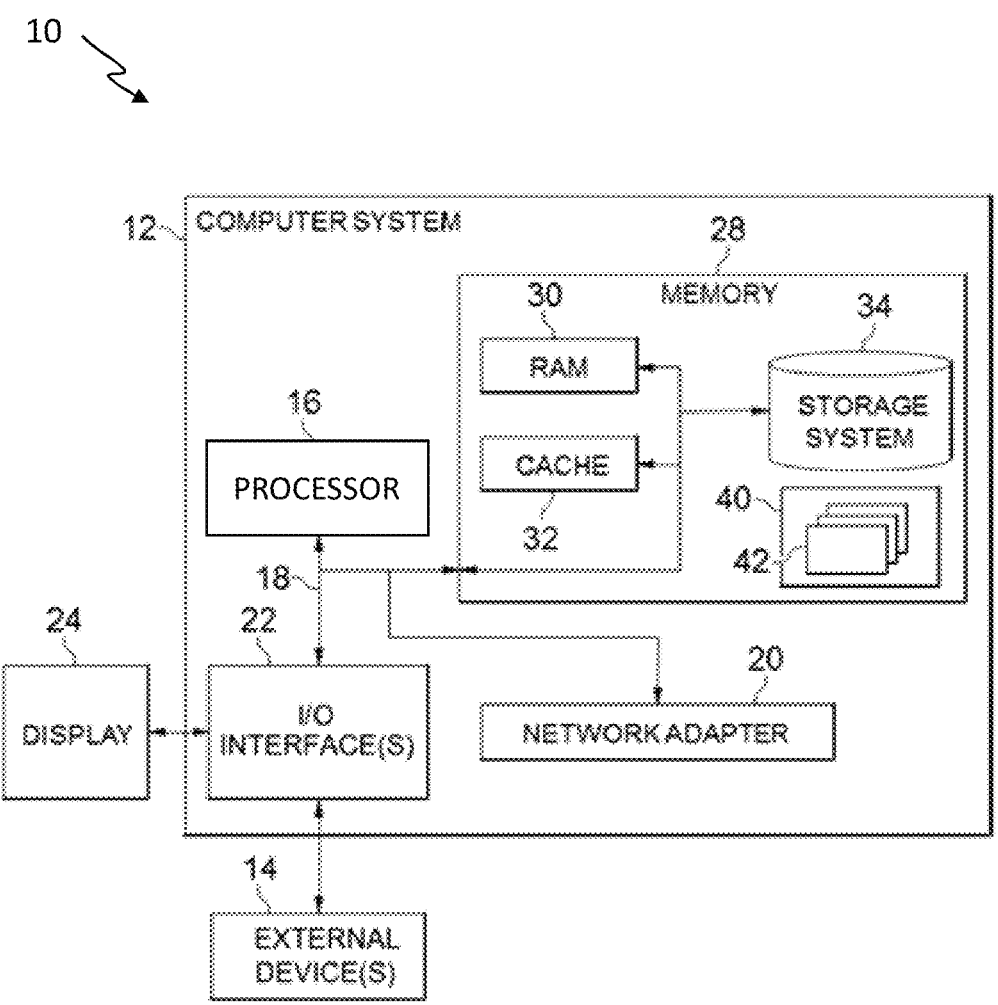
FIG. 6 depicts a cloud computing node according to an embodiment of the present invention.
Figure 7:
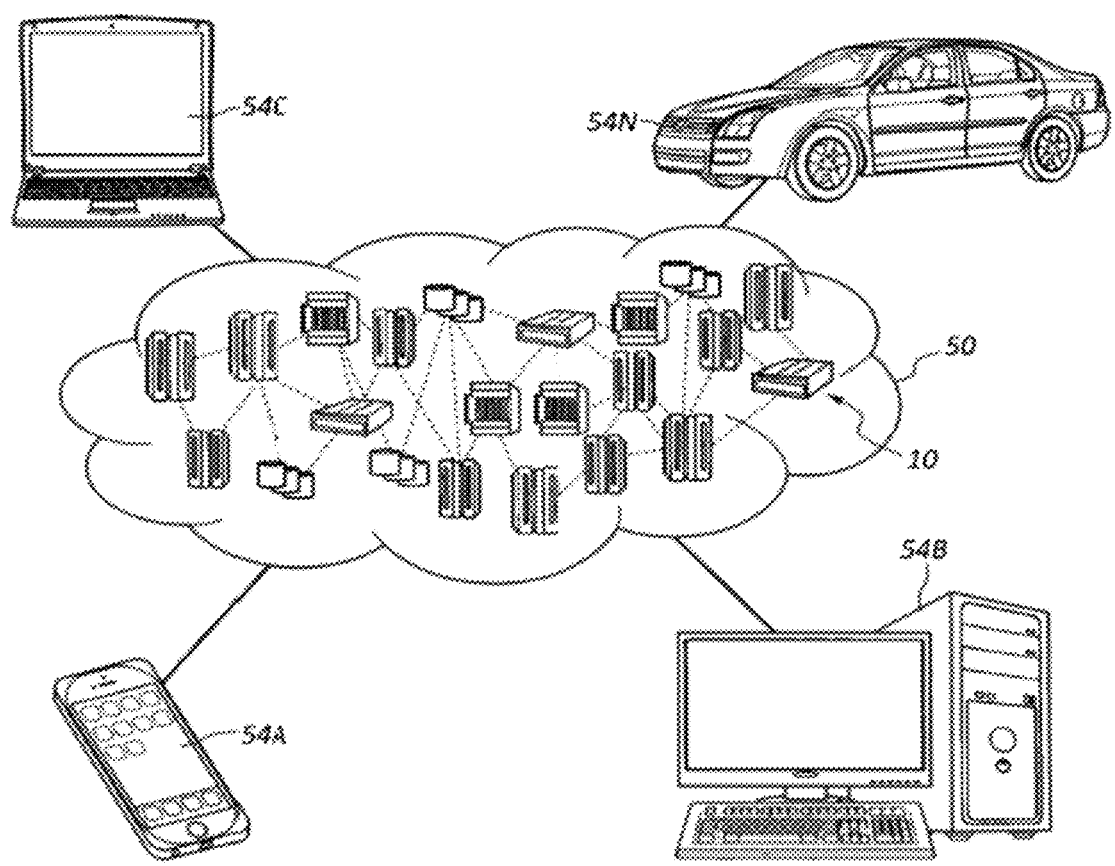
FIG. 7 depicts a cloud computing environment according to an embodiment of the present invention.
Figure 8:
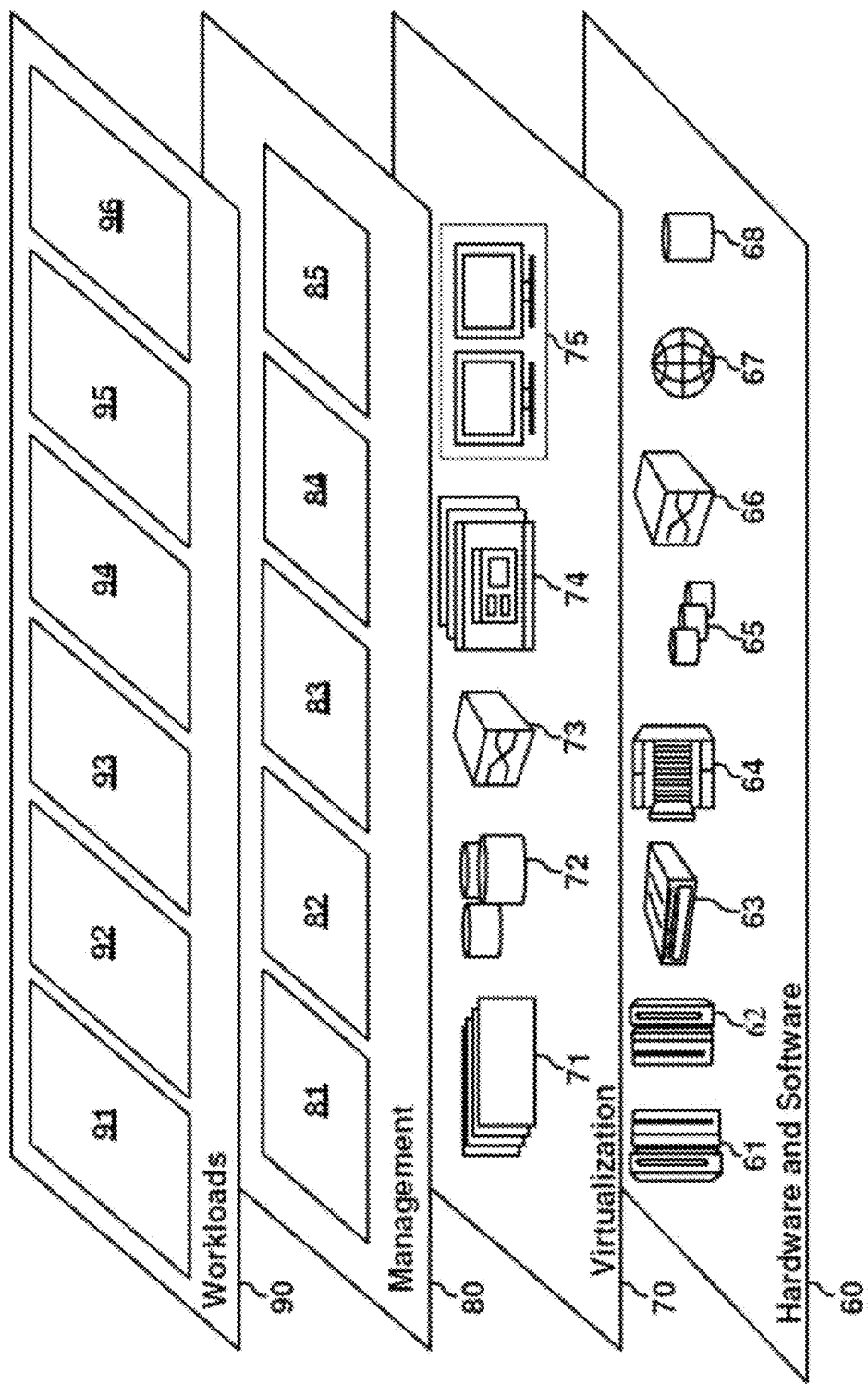
FIG. 8 depicts abstraction model layers according to an embodiment of the present invention.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive impromptu interaction assistant 120 of FIG. 1. Program processes 42, as in the cognitive impromptu interaction assistant 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive impromptu interaction assistant 96, as described herein. The processing components 96 can be understood as one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for accommodating an impromptu interaction, comprising:

subjecting text based work product content of a corporate communication database to natural language processing to derive (a) extracted topics associated to the text based work product content, (b) extracted tones associated to respective ones of the extracted topics, and (c) extracted identifiers for persons associated to respective ones of the extracted topics;

collecting, by one or more processor, real time location data of two or more users as generated by respective user device, wherein the real time location data for each of the two or more users are generated by the respective user device that records movement with a plurality of location monitoring devices in a corporate premises, and wherein the real time location data of the two or more users are continuously and individually synchronized in an employee location repository as each of the two or more users moves about within the corporate premises;

identifying, by the one or more processor, two or more candidates for the impromptu interaction amongst the two or more users responsive to determining that respective real time locations of the candidates as represented in the employee location repository are converging;

predicting, by the one or more processor, using the extracted topics and the extracted identifiers for persons, a topic of the impromptu interaction amongst content of a topic repository respective to the two or more candidates based on a common work interest amongst the two or more candidates from the identifying, wherein the common work interest is represented in the corporate communication database including corporate community postings, instant messages, and work products associated with the two or more candidates, the predicting comprising discovering one or more topic with which the candidates are commonly involved by authoring or being mentioned in any communication and/or work product relevant to the respective one or more topic, wherein the one or more topic includes the topic of the impromptu interaction; calculating one or more confidence score respectively corresponding to the one or more topic; and selecting the topic of the impromptu interaction corresponding to the highest confidence score amongst the one or more confidence score, the calculating comprising factoring in a number of the candidates, a priority of the topic, and combinations thereof to each confidence score of each topic such that the confidence score of the topic is proportional to the number of the candidates and the priority of the topic, wherein the one or more confidence score respectively indicates how likely the respective topic would be discussed in the impromptu interaction amongst the candidates; and sending, by the one or more processor, a notification of the impromptu interaction to a user device of one of the two or more candidates subsequent to generating the notification including i) the topic, ii) identification of another of the two or more candidates, and iii) links to access resources relevant to the topic from the user device, wherein the resources are associated with the topic in the topic repository as being helpful in discussing the topic, to thereby improve work efficiency regarding the topic in a corporate environment by facilitating the impromptu interaction, and iv) a specifier for a level of confidence that indicates how likely the topic would be discussed in the impromptu interaction amongst the two or more candidates.

2. The computer implemented method of claim 1, the identifying comprising:

monitoring the respective location data of the two or more users as received from the collecting in real time, wherein the respective user device is equipped to read a direction and a pace of movement of each of the two or more users;

ascertaining that the respective locations of the candidates will be within a preconfigured proximity at a certain point of time in the future; and selecting the candidates for the impromptu interaction responsive to the ascertaining.

3. The computer implemented method of claim 1, the identifying comprising:

discovering a scheduled event for one candidate of the candidates based on calendar data;

tracking movement of another candidate of the candidates by use of a user device corresponding to another candidate;

ascertaining that the another candidate moves toward a location of the scheduled event at around the time of the scheduled event; and selecting the candidates for the impromptu interaction responsive to the ascertaining.

4. The computer implemented method of claim 1, the identifying comprising:

discovering a movement pattern for a first candidate of the candidates routinely inhabiting a certain location at around a certain time based on cumulated location data;

tracking movement of a second candidate of the candidates by use of a user device corresponding to the second candidate;

ascertaining that the second candidate moves toward the certain location at around the certain time; and selecting the candidates for the impromptu interaction responsive to the ascertaining.

5. The computer implemented method of claim 1, the identifying comprising:

monitoring the respective location data of the two or more users as received from the collecting in real time, wherein the respective user device is equipped to read a direction and a pace of movement of each of the two or more users.

6. The computer implemented method of claim 1, the identifying comprising:

discovering a scheduled event for one candidate of the candidates based on calendar data.

7. The computer implemented method of claim 1, the identifying comprising:

discovering a movement pattern for a first candidate of the candidates routinely inhabiting a certain location at around a certain time based on cumulated location data.

8. A system comprising:

a memory;

one or more processor in communication with the memory; and program instructions executable by the one or more processor via the memory to perform a method for accommodating an impromptu interaction, comprising:

subjecting text based work product content of a corporate communication database to natural language processing to derive (a) extracted topics associated to the text based work product content, (b) extracted tones associated to respective ones of the extracted topics, and (c)

extracted identifiers for persons associated to respective ones of the extracted topics;

collecting real time location data of two or more users as generated by respective user device, wherein the real time location data for each of the two or more users are generated by the respective user device that records movement with a plurality of location monitoring devices in a corporate premises, and wherein the real time location data of the two or more users are continuously and individually synchronized in an employee location repository as each of the two or more users moves about within the corporate premises;

identifying two or more candidates for the impromptu interaction amongst the two or more users responsive to determining that respective real time locations of the candidates as represented in the employee location repository are converging;

predicting using the extracted topics and the extracted identifiers for persons, a topic of the impromptu interaction amongst content of a topic repository respective to the two or more candidates based on a common work interest amongst the two or more candidates from the identifying, wherein the common work interest is represented in the corporate communication database including corporate community postings, instant messages, and work products associated with the two or more candidates, the predicting comprising discovering one or more topic with which the candidates are commonly involved by authoring or being mentioned in any communication and/or work product relevant to the respective one or more topic, wherein the one or more topic includes the topic of the impromptu interaction; calculating one or more confidence score respectively corresponding to the one or more topic; and selecting the topic of the impromptu interaction corresponding to the highest confidence score amongst the one or more confidence score, the calculating comprising factoring in a number of the candidates, a priority of the topic, and combinations thereof to each confidence score of each topic such that the confidence score of the topic is proportional to the number of the candidates and the priority of the topic, wherein the one or more confidence score respectively indicates how likely the respective topic would be discussed in the impromptu interaction amongst the candidates; and sending a notification of the impromptu interaction to a user device of one of the two or more candidates subsequent to generating the notification including i) the topic, ii) identification of another of the two or more candidates, and iii) links to access resources relevant to the topic from the user device, wherein the resources are associated with the topic in the topic repository as being helpful in discussing the topic, to thereby improve work efficiency regarding the topic in a corporate environment by facilitating the impromptu interaction, and iv) a specifier for a level of confidence that indicates how likely the topic would be discussed in the impromptu interaction amongst the two or more candidates.

9. The system of claim 8, the identifying comprising:
monitoring the respective location data of the two or more users as received from the collecting in real time, wherein the respective user device is equipped to read a direction and a pace of movement of each of the two or more users;
ascertaining that the respective locations of the candidates will be within a preconfigured proximity at a certain point of time in the future; and
selecting the candidates for the impromptu interaction responsive to the ascertaining.

10. The system of claim 8, the identifying comprising:
discovering a scheduled event for one candidate of the candidates based on calendar data;
tracking movement of another candidate of the candidates by use of a user device corresponding to another candidate;
ascertaining that the another candidate moves toward a location of the scheduled event at around the time of the scheduled event; and
selecting the candidates for the impromptu interaction responsive to the ascertaining.

11. The system of claim 8, the identifying comprising:
discovering a movement pattern for a first candidate of the candidates routinely inhabiting a certain location at around a certain time based on cumulated location data;
tracking movement of a second candidate of the candidates by use of a user device corresponding to the second candidate;
ascertaining that the second candidate moves toward the certain location at around the certain time; and
selecting the candidates for the impromptu interaction responsive to the ascertaining.

12. The system of claim 8, the identifying comprising:
monitoring the respective location data of the two or more users as received from the collecting in real time, wherein the respective user device is equipped to read a direction and a pace of movement of each of the two or more users.

13. The system of claim 8, the identifying comprising:
discovering a scheduled event for one candidate of the candidates based on calendar data.

14. The system of claim 8, the identifying comprising:
discovering a movement pattern for a first candidate of the candidates routinely inhabiting a certain location at around a certain time based on cumulated location data.

15. A computer program product comprising:
a computer readable storage medium readable by one or more processor and storing instructions for execution by the one or more processor for performing a method for accommodating an impromptu interaction, comprising:
subjecting text based work product content of a corporate communication database to natural language processing to derive (a) extracted topics associated to the text based work product content, (b) extracted tones associated to respective ones of the extracted topics, and (c) extracted identifiers for persons associated to respective ones of the extracted topics;
collecting real time location data of two or more users as generated by respective user device, wherein the real time location data for each of the two or more users are generated by the respective user device that records movement with a plurality of location monitoring devices in a corporate premises, and wherein the real time location data of the two or more users are continuously and individually synchronized in an employee location repository as each of the two or more users moves about within the corporate premises;
identifying two or more candidates for the impromptu interaction amongst the two or more users responsive to determining that respective real time locations of the candidates as represented in the employee location repository are converging;

predicting using the extracted topics and the extracted identifiers for persons, a topic of the impromptu interaction amongst content of a topic repository respective to the two or more candidates based on a common work interest amongst the two or more candidates from the identifying, wherein the common work interest is represented in the corporate communication database including corporate community postings, instant messages, and work products associated with the two or more candidates, the predicting comprising discovering one or more topic with which the candidates are commonly involved by authoring or being mentioned in any communication and/or work product relevant to the respective one or more topic, wherein the one or more topic includes the topic of the impromptu interaction; calculating one or more confidence score respectively corresponding to the one or more topic; and selecting the topic of the impromptu interaction corresponding to the highest confidence score amongst the one or more confidence score, the calculating comprising factoring in a number of the candidates, a priority of the topic, and combinations thereof to each confidence score of each topic such that the confidence score of the topic is proportional to the number of the candidates and the priority of the topic, wherein the one or more confidence score respectively indicates how likely the respective topic would be discussed in the impromptu interaction amongst the candidates; and sending a notification of the impromptu interaction to a user device of one of the two or more candidates subsequent to generating the notification including i) the topic, ii) identification of another of the two or more candidates, and iii) links to access resources relevant to the topic from the user device, wherein the resources are associated with the topic in the topic repository as being helpful in discussing the topic, to thereby improve work efficiency regarding the topic in a corporate environment by facilitating the impromptu interaction, and iv) a specifier for a level of confidence that indicates how likely the topic would be discussed in the impromptu interaction amongst the two or more candidates.

16. The computer program product of claim 15, the identifying comprising:
monitoring the respective location data of the two or more users as received from the collecting in real time, wherein the respective user device is equipped to read a direction and a pace of movement of each of the two or more users;
ascertaining that the respective locations of the candidates will be within a preconfigured proximity at a certain point of time in the future; and
selecting the candidates for the impromptu interaction responsive to the ascertaining.

17. The computer program product of claim 15, the identifying comprising:
discovering a scheduled event for one candidate of the candidates based on calendar data;
tracking movement of another candidate of the candidates by use of a user device corresponding to another candidate;
ascertaining that the another candidate moves toward a location of the scheduled event at around the time of the scheduled event; and
selecting the candidates for the impromptu interaction responsive to the ascertaining.

18. The computer program product of claim 15, the identifying comprising:
discovering a movement pattern for a first candidate of the candidates routinely inhabiting a certain location at around a certain time based on cumulated location data;
tracking movement of a second candidate of the candidates by use of a user device corresponding to the second candidate;
ascertaining that the second candidate moves toward the certain location at around the certain time; and
selecting the candidates for the impromptu interaction responsive to the ascertaining.

19. The computer program product of claim 15, the identifying comprising:
monitoring the respective location data of the two or more users as received from the collecting in real time, wherein the respective user device is equipped to read a direction and a pace of movement of each of the two or more users.

20. The computer program product of claim 15, the identifying comprising:
discovering a movement pattern for a first candidate of the candidates routinely inhabiting a certain location at around a certain time based on cumulated location data.

* * * * *